United States Patent
Anthony

[11] 3,755,867
[45] Sept. 4, 1973

[54] POT BROACH
[75] Inventor: Russell W. Anthony, Harper Wood, Mich.
[73] Assignee: Lear Siegler, Inc., Santa Monica, Calif.
[22] Filed: Aug. 17, 1972
[21] Appl. No.: 281,450

Related U.S. Application Data
[63] Continuation of Ser. No. 132,834, April 9, 1971, abandoned.

[52] U.S. Cl. .............................................. 29/95.1 R
[51] Int. Cl. .............................................. B26d 1/04
[58] Field of Search ...................................... 29/95.1

[56] References Cited
UNITED STATES PATENTS
3,331,115 7/1967 Daniel ............................... 29/95.1
3,022,710 2/1962 Kopel ................................. 29/95.1
2,674,780 4/1954 Nielson ............................... 29/95.1
2,398,310 4/1946 Howell ............................... 29/95.1
2,304,185 12/1942 Lee .................................... 29/95.1
1,485,652 3/1924 Wakefield et al. .................. 29/95.1
3,332,129 7/1967 Psenka ............................... 29/95.1
772,841 10/1904 Smith ................................. 29/95.1

Primary Examiner—Harrison L. Hinson
Attorney—Donald P. Bush

[57] ABSTRACT

A pot broach having an assembly of a multiplicity of internally toothed broach rings. The rings are normally flat and have corresponding parts of all cutting teeth occupying a plane. In assembly, the rings are bent about a diameter so as to provide progressive displacement of cutting teeth axially of the holder which provides for progressive initiation of cuts by at least some of the teeth of each ring.

12 Claims, 1 Drawing Figure

Patented Sept. 4, 1973  3,755,867
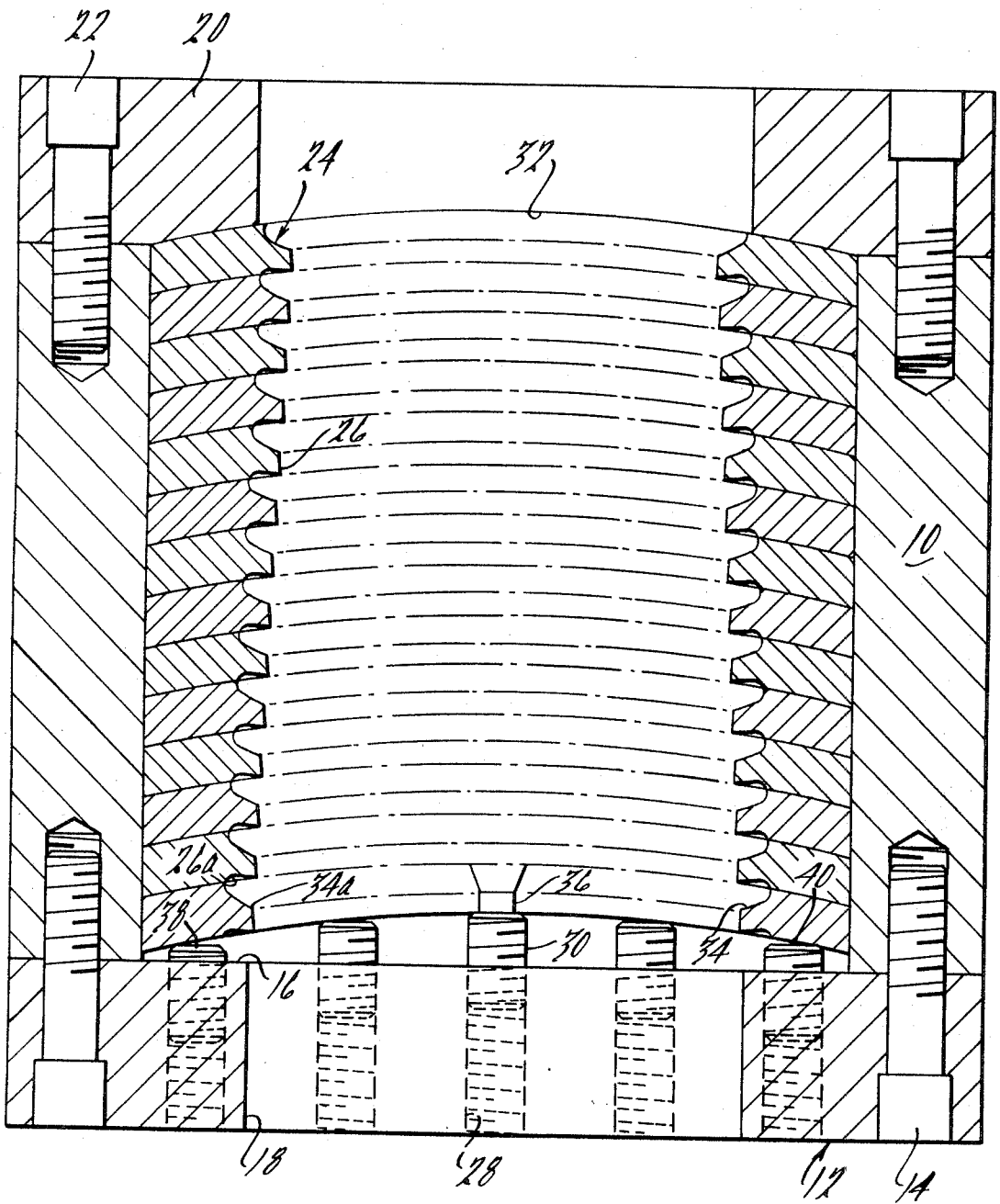
INVENTOR.
Russell W. Anthony.
BY Whittemore
Hulbert & Belknap
ATTORNEYS

POT BROACH

This is a continuation of application Ser. No. 132,834, filed Apr. 9, 1971 now abandoned.

BRIEF SUMMARY OF THE INVENTION

Pot broaches are employed in forming externally toothed gears. A very efficient pot broach employs a generally tubular holder in which a multiplicity of internally toothed broach rings are assembled together.

These rings in general, are identical except that the inwardly projecting teeth of successive rings extend beyond preceding teeth to provide a succession of cuts. Normally each of the rings is perfectly flat and the inwardly projecting cutting teeth occupy planes perpendicular to the axis of the ring.

When these rings are assembled and clamped together in the tubular holder, it will be obvious that all of the cutting teeth of each initiate their cuts simultaneously on a work piece. Similarly, all of the teeth of each ring terminate their cuts simultaneously. Accordingly, the forces required to move the work blank through the broach rings or vise-versa, fluctuate and an uneven cutting action is obtained.

According to the present invention the assembly of rings is distorted so that at least some of the cutting teeth of each ring, in the assembly, are displaced relatively to each other longitudinally of the holder, so as to provide for a gradual or progressive initiation and termination of cutting action of the teeth of each broach ring.

Conveniently, this is accomplished by providing abutments against which the end broach ring is clamped, the abutments being positioned to cause transverse bending of the broach ring about a diameter. As all of the broach rings are clamped together, identical bending of all of the broach rings occurs.

It will be observed that with this arrangement the crests of the cutting teeth of each ring are disposed to occupy a generally sinusoidal three-dimensional curve occupying a cylinder.

BRIEF DESCRIPTION OF THE DRAWING

The FIGURE is a longitudinal sectional view through a pot broach embodying the present invention.

DETAILED DESCRIPTION

The pot broach comprises an elongated generally cylindrical holder 10 partly closed at one end by a ring 12 bolted or otherwise secured to the cylindrical holder by screws 14. The ring 12 has a radially inwardly extending portion 16 and is provided with a central opening 18 through which work blanks pass. Normally, the assembly of rings is clamped against the upper surface of the inwardly projecting portion 16 of the ring 18 by a clamping ring 20 secured to the opposite end of the tubular holder by suitable means such as clamping screws 22. With this arrangement, and if the upper surface of the inwardly projecting flange 16 of the ring 12 is flat, all of the broach rings, here designated as 24, will remain flat and the cutting tips 26 of all of the teeth of each ring will all initiate and terminate their cutting action simultaneously.

According to the present invention the inwardly projecting flange 16 of the ring 12 is provided with a multiplicity of threaded openings 28 which receive threaded abutment screws 30 adapted to be adjusted to extend above the upper surface of the flange 16 as illustrated. Accordingly, as the broach rings are rigidly clamped by forces applied to the upper surface thereof to press them downwardly into engagement with the adjustable abutment screws, the bottom ring and all rings thereabove are bent transversely about a diametrical axis. Accordingly, since all of the rings above the bottommost ring here designated 26a, are bent into conformity with the bottom ring, it will be appreciated that the upper clamping ring 20 will be provided with a transversely curved clamping surface 32.

Accordingly, if the rings are bent symmetrically, the two teeth 34 of the lower broach ring 28a are positioned ahead of other teeth and two diametrically opposite teeth, one of which is indicated at 36, are positioned behind all of the other teeth of the ring, all as measured in the cutting direction. The teeth intermediate the teeth 34 and 36 are all displaced longitudinally of the broach with the result that the initiation and termination of the cuts by the teeth of each broach ring are progressive and a smoother cutting action is obtained.

In addition to the desirable results obtained simply by transversely bending all of the broach rings, as heretofore described, it will be appreciated that a secondary effect may be accomplished by positioning the diametrically opposed abutment screws 38 and 40 at slightly different heights so that in addition to being bent, the rings are slightly canted. It will of course further be obvious that the rings may be canted without being bent.

The teeth may be ground on the individual broach rings while the rings are held in the position which they will occupy in the finished broach.

What I claim as my Invention is:

1. A pot broach comprising a generally tubular holder, a series of broach rings having cutting teeth at their inner sides, each ring being normally flat and having corresponding parts of its cutting teeth occupying a plane perpendicular to the axis of said ring, and means clamping a series of said rings in said holder including means for displacing portions of said rings out of plane perpendicular to the holder axis to position the leading ends of some of said teeth of each of said rings at different positions along said holder to avoid simultaneous initiation and termination of all cuts by the teeth of each ring.

2. A broach as defined in claim 1 in which the displacement of portions of said rings results from bending said rings about diameters thereof.

3. A broach as defined in claim 1 in which the displacement of portions of said rings results from canting said rings slightly about diameters thereof.

4. A broach as defined in claim 1 in which the displacement of portions of said rings results from bending said rings about diameters thereof, and simultaneously canting said rings slightly about diameters thereof.

5. A broach as defined in claim 1 in which the tubular holder has an inwardly projecting flange adjacent one end against which the assembly of rings is clamped, and abutments on said flange positioned to bend a ring pressed into engagement with all of said abutment.

6. A broach as defined in claim 5 in which said abutments are independently adjustable in a direction parallel to the axis of said holder.

7. A broach as defined in claim 5 in which the means for clamping said rings comprises a clamping ring shaped to engage the broach ring at the other end.

8. A broach as defined in claim 7 in which said abutments are positioned to bend the broach rings about diameters thereof.

9. A broach as defined in claim 8 in which said abutments are positioned to cant the broach rings slightly about diameters thereof.

10. A broach as defined in claim 7 in which said abutments are positioned to bend the broach rings about diameters thereof and simultaneously to cant said broach rings slightly about diameters thereof.

11. A pot broach for broaching external gears comprising a generally tubular holder, a series of broach rings assembled together in said holder with adjacent sides of said rings in contact, each ring having a series of circumferentially spaced cutting teeth, corresponding teeth of said rings being in alignment longitudinally of said broach and progressively stepped to cut a multiplicity of tooth spaces in a work piece moved longitudinally through said broach, some of the teeth of each ring being spaced axially of the broach from other teeth of the ring to avoid simultaneous initiation and termination of all cuts by the teeth of each ring, and means clamping said rings in said holder.

12. A broach as defined in claim 11 in which progressively circumferentially spaced teeth of each ring are disposed in axially spaced progressions.

* * * * *